(12) United States Patent
Yoshida et al.

(10) Patent No.: US 8,230,606 B2
(45) Date of Patent: Jul. 31, 2012

(54) ELECTRIC TOOL

(75) Inventors: Kenichirou Yoshida, Ibaraki (JP);
Yoshio Osada, Ibaraki (JP); Mizuho Nakamura, Ibaraki (JP); Satsuo Sato, Ibaraki (JP); Junichi Kamimura, Ibaraki (JP); Takashi Kawamata, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 312 days.

(21) Appl. No.: 11/150,470

(22) Filed: Jun. 13, 2005

(65) Prior Publication Data

US 2005/0274028 A1   Dec. 15, 2005

(30) Foreign Application Priority Data

Jun. 14, 2004  (JP) ............................... P2004-176240
Apr. 12, 2005  (JP) ............................... P2005-115179

(51) Int. Cl.
*B23D 47/02* (2006.01)
*B23D 51/02* (2006.01)
*B23D 45/16* (2006.01)
*B27B 9/00* (2006.01)

(52) U.S. Cl. ........................................... 30/388; 30/370

(58) Field of Classification Search ............. 30/370, 30/517, 522, 375–377, 388–394, 373; 83/279
See application file for complete search history.

(56) References Cited

U.S. PATENT DOCUMENTS

| | | | | |
|---|---|---|---|---|
| 2,737,213 A | * | 3/1956 | Richards et al. | 30/376 |
| 2,761,474 A | * | 9/1956 | Dolan | 30/376 |
| 2,800,933 A | * | 7/1957 | Michael | 30/373 |
| 2,819,742 A | * | 1/1958 | Blachly | 30/373 |
| 3,087,519 A | * | 4/1963 | McCarty et al. | 30/376 |
| 3,150,692 A | * | 9/1964 | Blake | 139/28 |
| 3,277,934 A | * | 10/1966 | Yelpo | 30/376 |
| 3,292,673 A | * | 12/1966 | Gregory | 30/377 |
| 4,202,233 A | * | 5/1980 | Larson | 83/745 |
| 4,414,745 A | * | 11/1983 | Kuhlmann et al. | 30/373 |
| 4,589,208 A | * | 5/1986 | Iwasaki et al. | 30/376 |
| 4,977,221 A | * | 12/1990 | Yoshimura et al. | 525/356 |
| 5,010,651 A | * | 4/1991 | Techter et al. | 303/76 |
| 5,012,583 A | * | 5/1991 | Blochle et al. | 30/392 |
| 5,108,813 A | * | 4/1992 | Noda et al. | 428/141 |

(Continued)

FOREIGN PATENT DOCUMENTS

CN     2191073 Y     3/1995

(Continued)

OTHER PUBLICATIONS

Chinese Office Action dated Mar. 28, 2008 with English translation.

(Continued)

*Primary Examiner* — Ghassem Alie
*Assistant Examiner* — Bharat C Patel
(74) *Attorney, Agent, or Firm* — McGinn IP Law Group, PLLC

(57) ABSTRACT

The electric tool includes a base having an opening portion and a bottom face; a blade being projected downward from the bottom face of the base through the opening portion of the base, the blade being capable of cutting while sliding the bottom face of the base on an upper face of a work piece; a motor driving the blade; a housing accommodating the motor. The bottom face of the base is at least partially coated with a resin including fluorine.

17 Claims, 15 Drawing Sheets

U.S. PATENT DOCUMENTS

| | | | |
|---|---|---|---|
| 5,675,895 A * | 10/1997 | Mori et al. | 30/124 |
| 5,964,039 A * | 10/1999 | Mizoguchi et al. | 30/392 |
| 6,553,675 B2 * | 4/2003 | Orrico | 30/376 |
| 6,757,981 B2 * | 7/2004 | Hampton | 30/372 |
| 7,159,323 B2 * | 1/2007 | Petrenko | 30/373 |
| 7,275,326 B2 * | 10/2007 | Tanimoto et al. | 30/391 |
| 7,296,356 B2 * | 11/2007 | Ngan et al. | 30/376 |
| 2003/0091746 A1 * | 5/2003 | Takahashi et al. | 427/385.5 |
| 2004/0040425 A1 * | 3/2004 | Peyerl et al. | 83/56 |
| 2004/0107584 A1 * | 6/2004 | Yoshida et al. | 30/391 |
| 2004/0163263 A1 * | 8/2004 | Wadge | 30/376 |

FOREIGN PATENT DOCUMENTS

| | | | |
|---|---|---|---|
| CN | 1176861 A | 3/1998 | |
| CN | 1442617 A | 9/2003 | |
| DE | 198 50 346 A1 | 5/2000 | |
| JP | UMA 53-24592 | 3/1978 | |
| JP | UMA 57-86302 | 5/1982 | |
| JP | UMA 6-46903 | 6/1994 | |
| JP | UMA 06-46903 | 6/1994 | |
| JP | 6-346017 | 12/1994 | |
| JP | 11-192601 | 7/1999 | |
| JP | 2001-315075 | 11/2001 | |
| JP | 2002-370202 | 12/2002 | |
| JP | 2003-211084 | 7/2003 | |
| WO | WO 03/085459 * | 6/2003 | 399/350 |

OTHER PUBLICATIONS

Japanese Office Action dated Jun. 16, 2009 (with English translation).

Japanese Patent Application No. 2005-115179 Office Action dated Mar. 23, 2010, with English translation.

* cited by examiner

ELECTRIC TOOL

BACKGROUND OF THE INVENTION

1. Field of the Invention

The present invention relates to an electric tool having a base.

2. Description of the Related Art

An electric tool will be explained in reference to FIGS. 1, 2. FIGS. 1, 2 show an example of a portable circular saw as an electric tool which is constructed by a constitution of including a saw blade 1, a motor 2 for driving to rotate the saw blade 1, a housing 3 for accomodating the motor 2, a saw cover 4 for rotatably holding the saw blade 1, and a base 5 provided on lower sides of the housing 3 and the saw cover 4 and having an opening portion 5a for enabling to project the saw blade 1 from a lower face thereof, the saw cover 4 is attached to the housing 3, and the base 5 is connected to the housing 3 or the saw cover 4, or the housing 3 and the saw cover 4. Power of the motor 2 is transmitted to the saw blade 1 via a gear 6 or the like to drive to rotate the saw blade 1.

As a material of the base 5, generally, die-cast aluminum, die-cast magnesium, hard plastic, iron plate or the like is used, and a surface thereof is subjected to a plating treatment or stays to be the material per se.

When an operator uses the portable circular saw configured by the structure, as shown by FIG. 7, the operator pushes the portable circular saw frontward in a cutting direction while pressing the base 5 onto a work piece 7 and cuts the work piece 7 while bringing a bottom face of the base 5 into close contact with and sliding on the work piece 7.

SUMMARY OF THE INVENTION

According to the above-described electric tool of the related art, when cutting a work piece producing highly adhesive dust as in, for example, a gypsum board, the electric tool is moved forward while pressing the base 5 on the work piece 7 deposited with dust flown up in cutting and therefore, the dust is adhered to the bottom face of the base 5, thereby, sliding movement of the bottom face of the base 5 is hampered. A load of pushing the portable circular saw forward becomes heavy to thereby pose a problem that operability is deteriorated. The electric tool cannot move forward and the work piece cannot be cut.

It is an object of the invention to provide an electric tool operability of which is not deteriorated even when a work piece producing a highly adhesive dust is cut.

The above-described object can be achieved by a constitution in which dust is difficult to be adhered to a base and sliding movement of a bottom face of the base is difficult to be hampered.

According to one aspect of the invention, there is provided with an electric tool including: a base having an opening portion and a bottom face; a blade being projected downward from the bottom face of the base through the opening portion of the base, the blade being capable of cutting while sliding the bottom face of the base on an upper face of a work piece; a motor driving the blade; and a housing accommodating the motor. The bottom face of the base is at least partially coated with a resin including fluorine.

By thus configuration, even when a work piece producing a highly adhesive dust is cut, the dust is difficult to be adhered to the bottom face of the base and the sliding movement of the bottom face of the base is not hampered to thereby prevent operability from being deteriorated.

DESCRIPTION OF THE PREFERRED EMBODIMENTS

An embodiment of an electric tool will be explained by taking an example of a portable circular saw.

Figure 8:
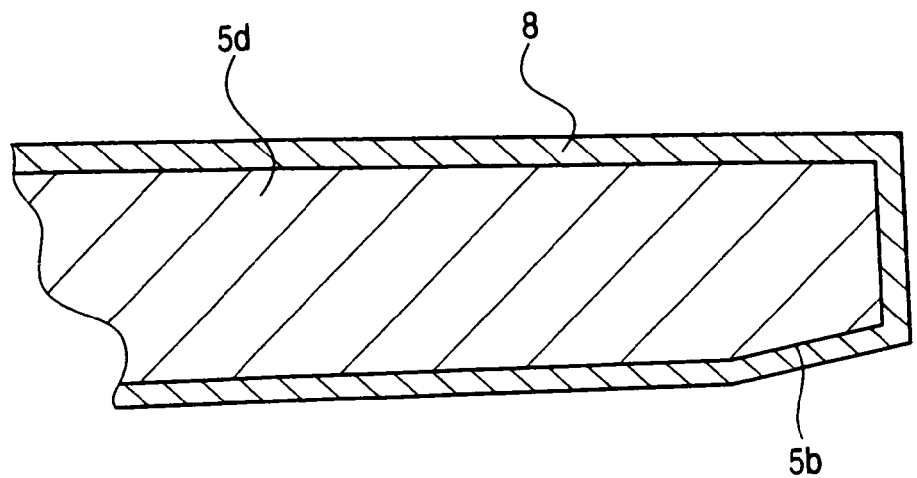
FIGS. 8A and 8B are sectional views showing the electric tool according to embodiments of the invention.
Figure 8:
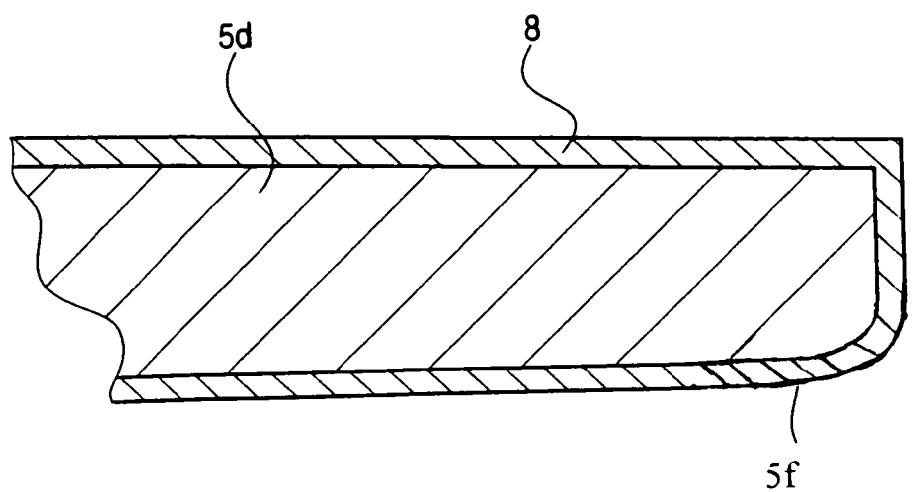

As shown by FIGS. 8A and 8B, a material 5d of the base 5 is configured by die-casting aluminum and an entire face thereof is coated with a resin 8 including fluorine to which dust or the like is difficult to be adhered to and having a low friction coefficient. Thereby, even when the bottom face of the base 5 is brought into close contact with and sliding on the work piece 7, dust is difficult to be adhered to the bottom face of the base 5 and therefore, sliding movement is not deteriorated and remains unchanged from that when the bottom face is started to use and the operability is not deteriorated.

Although the bottom face of the base 5 is apparently configured by a flat shape to be able to be cut the work piece 7 while sliding smoothly thereon, in order to restrain rattling of the base 5 when the bottom face of the base 5 is pressed to the work piece 7, as shown by FIGS. 3A, 3B, 4A, and 4B, in view from the bottom face, a center of the bottom face is made to be more or less concave, that is, an outer periphery thereof is made to be more or less convex. Further, in order to be able to slide smoothly on the work piece 7 without being caught, as shown by FIG. 3 through FIG. 6, an outer periphery of an end face of the base 5 and the bottom face as well as an inner periphery of the opening portion 5a and the bottom face are connected by either inclinations 5b or curvatures 5f.

By connecting the end face of the base 5 frontward in the cutting direction and the bottom face by the inclination 5b or the curvature 5f, it can be restrained that when the base 5 is moved forward in the cutting direction, the end face of the base 5 frontward in the cutting direction is caught by a small projected portion or the like on the work piece 7 and cannot slide thereon, or fluororesin coated on the base is slipped off by being caught thereby at an early stage.

Further, in starting cutting operation, there is frequently carried out the cutting operation while skewing the main body of the circular saw relative to an upper face of the work piece 7 and gradually making the base 5 and the upper face of the work piece 7 in parallel with each other by sliding the bottom face of the base 5 at a vicinity of the front end portion in the cutting direction on the upper face of the work piece 7, by connecting the front end face in the cutting direction of the base 5 and the bottom face by the inclination 5b or the curvature 5f as described above, it can be restrained that a corner portion of the front side in the cutting direction of the base 5 is locally worn and fluororesin is stripped off at an early stage. Further, by coating fluororesin over to the bottom face, the inclination 5b or the curvature 5f and the end face in the cutting direction of the base 5, it can further be restrained that fluororesin is stripped off.

Figure 1:
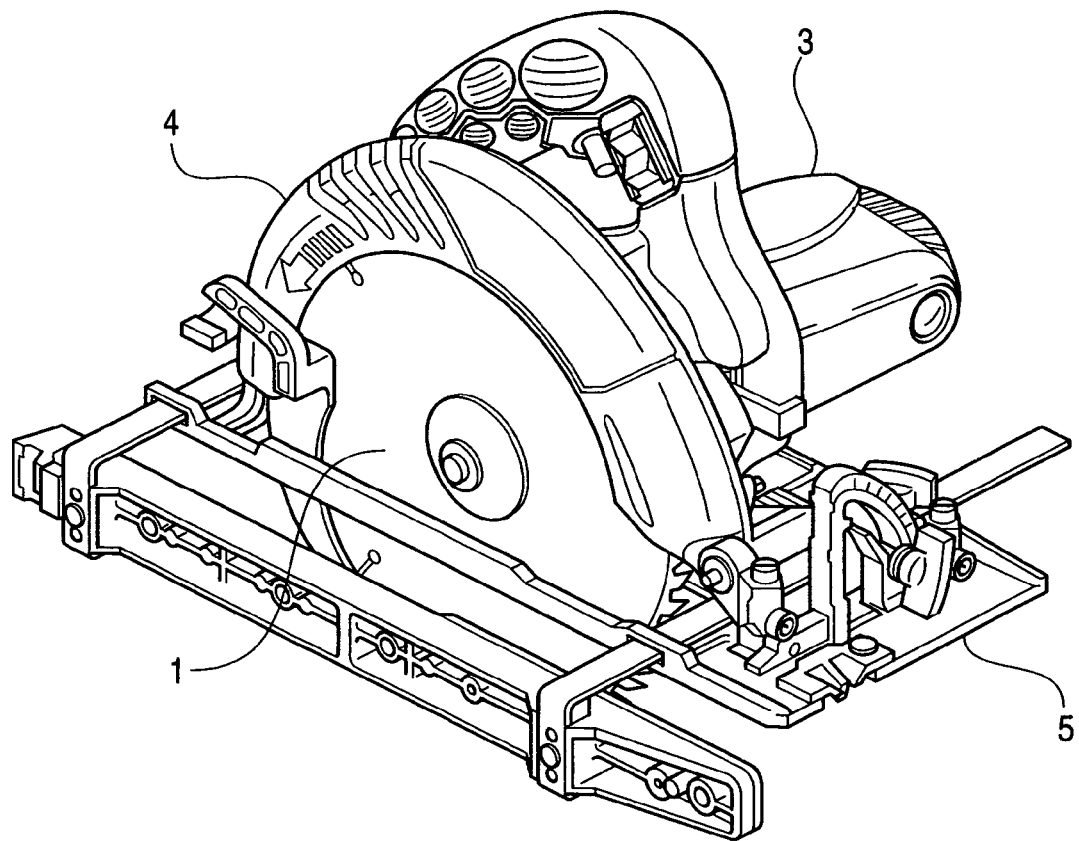
FIG. 1 is a perspective view showing an electric tool according to an embodiment of the invention.
Figure 2:
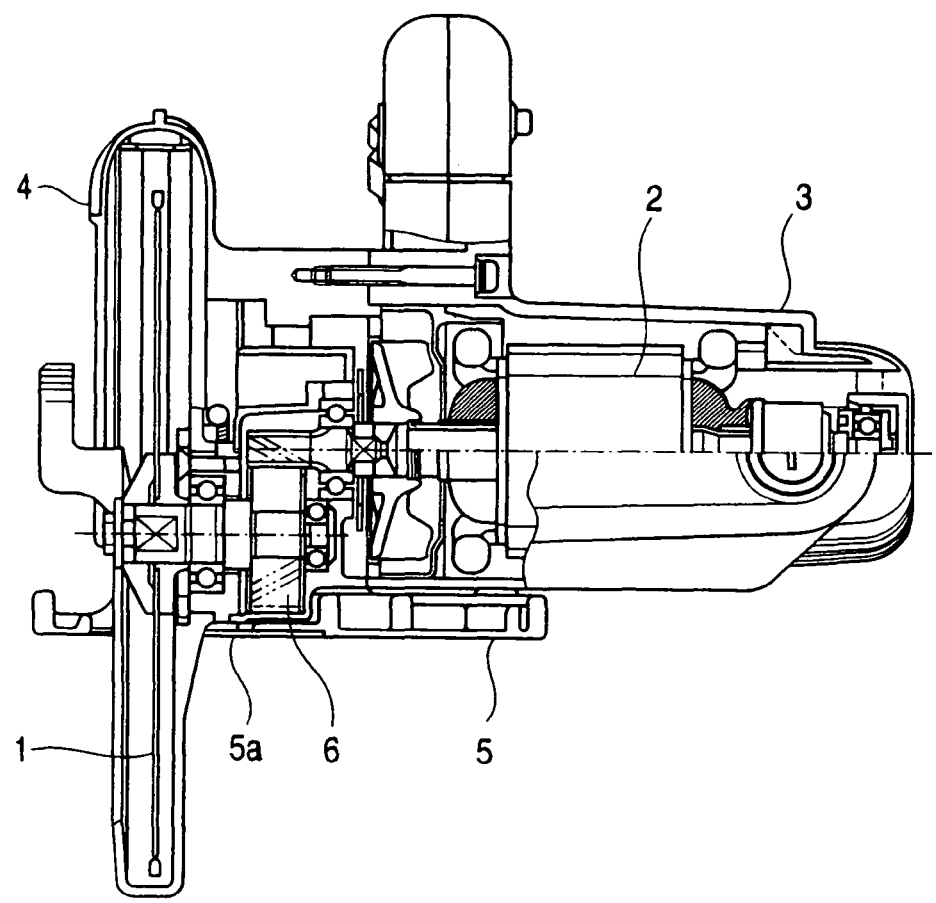
FIG. 2 is a sectional view showing the electric tool according to the embodiment.
Figure 3:
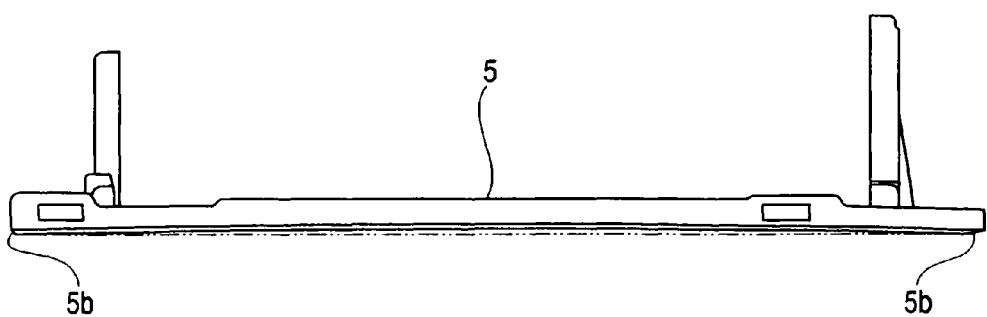
FIGS. 3A and 3B are front views showing a base according to embodiments of the invention.
Figure 3:
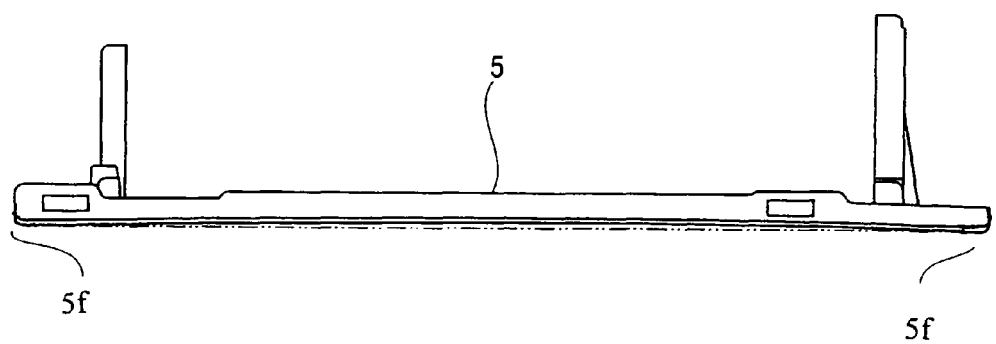
Figure 4A:
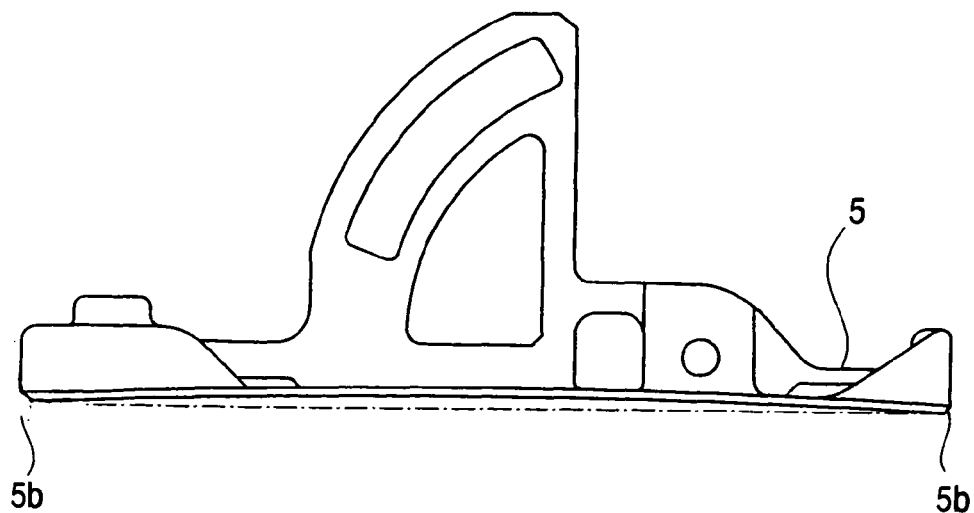
FIGS. 4A and 4B are side views showing a base according to embodiments of the invention.
Figure 4B:
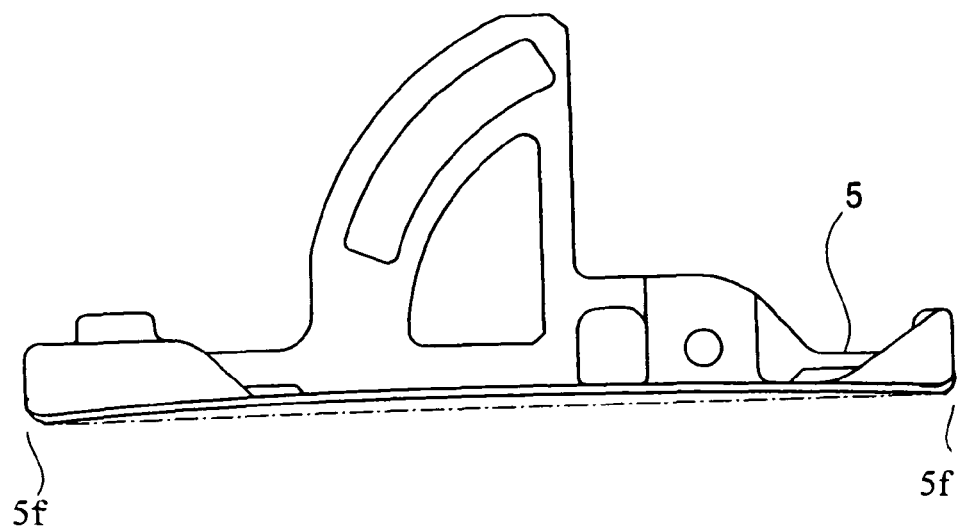
Figure 5A:
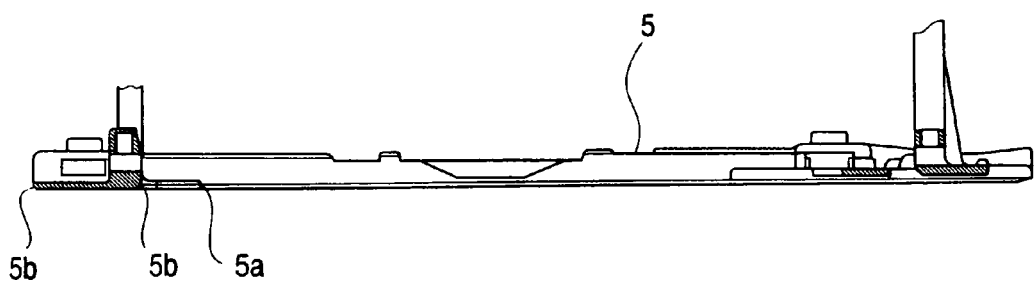
FIGS. 5A and 5B are front sectional views enlarging an essential portion showing the base according to embodiments of the invention.
Figure 5B:
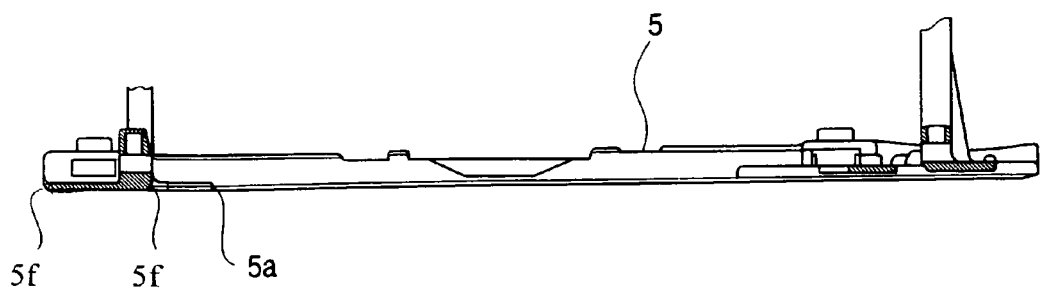
Figure 6A:
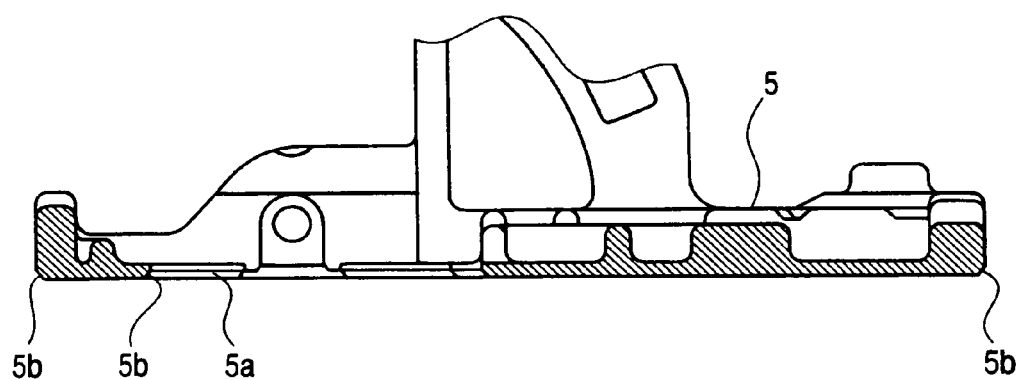
FIGS. 6A and 6B are side sectional views enlarging an essential portion showing the base according to embodiments of the invention.
Figure 6B:
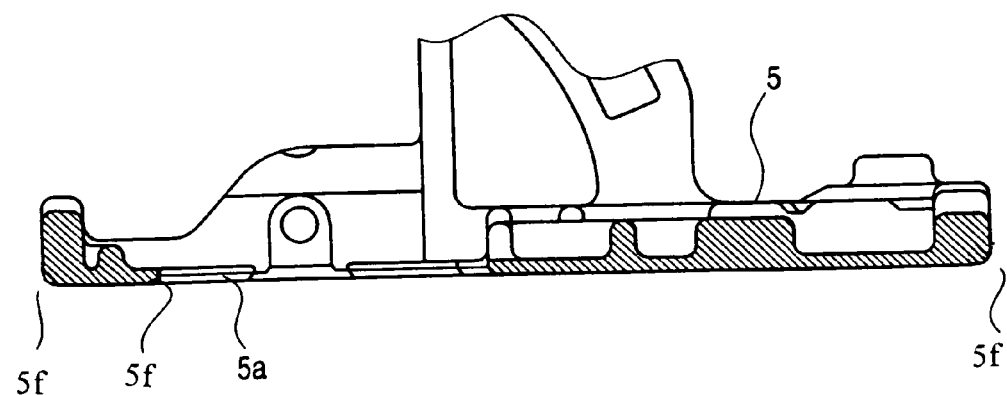
Figure 7:
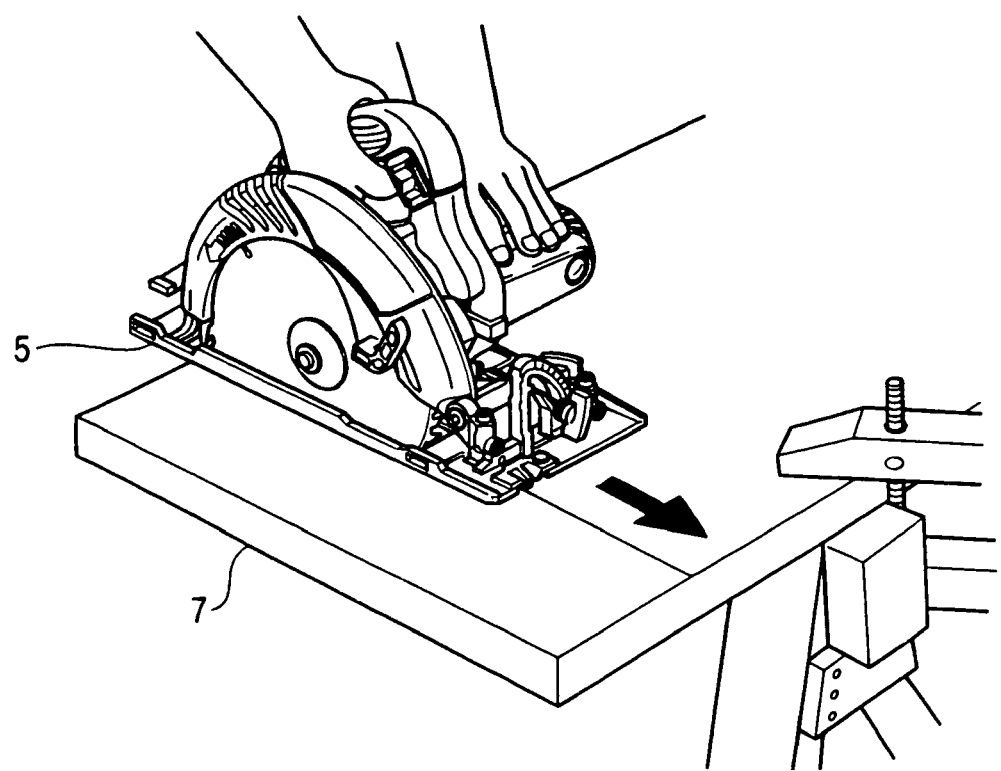
FIG. 7 is a perspective view showing a cutting operation state of an electric tool.

Further, by similarly connecting the inner peripheral portion on a rear side in the cutting direction of the opening portion 5a and the bottom face of the base 5 as shown by FIGS. 5A and 5B, it can be restrained that the inner peripheral portion on the rear side in the cutting direction of the opening portion 5a cannot be slid by being caught by a small projected portion or the like on the work piece 7, or fluororesin coated on the base is stripped off at an early stage by being caught thereby.

Further, when the main body of the circular saw is pulled up from the upper face of the work piece 7 in finishing to cut the work piece 7, there is frequently carried out operation of gradually skewing the main body of the circular saw relative to the upper face of the work piece 7 and pulling up the circular saw main body while sliding the bottom face at a vicinity of the rear end face in the cutting direction of the base 5 on the upper face of the work piece 7, by constructing a constitution of connecting the rear end face in the cutting direction of the base 5 and the bottom face of the base 5 by the inclination 5b or the curvature 5f, a portion of the circular saw main body sliding on the upper face of the work piece 7 can be dispersed when the main body is pulled up in finishing to cut the work piece 7, and it can be prevented that the corner portion of the bottom face on the rear side in the cutting direction of the base 5 is locally worn and fluororesin is stripped off at an early stage.

Figure 9:
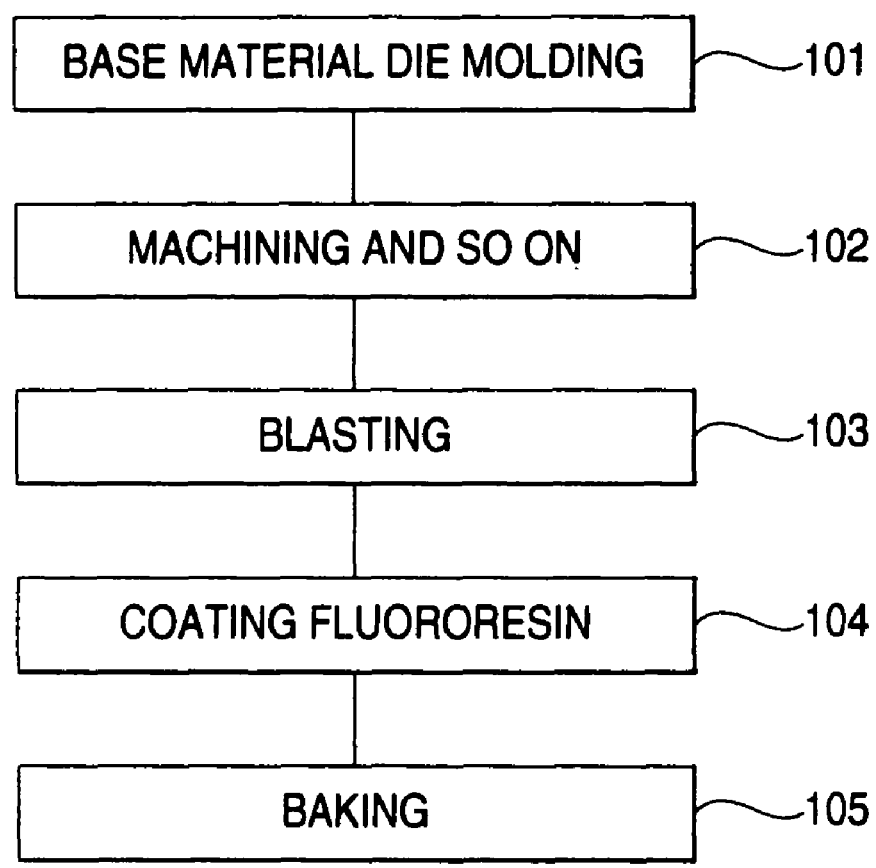
FIG. 9 is a flowchart showing steps of fabricating the electric tool according to an embodiment of the invention.

FIG. 9 shows an example of steps of fabricating the base of the electric tool. First, in the beginning, at step 101, the material of the base is molded by a die. At step 102, the bottom face of the base is subjected to machining, buffing or the like in order to promote planar accuracy, as well as screw hole working or the like. At step 103, in order to promote adhesivity of fluororesin to the base material, a face to be coated is roughened by blasting or the like. At step 104, the resin including fluorine is coated on the base. At that occasion, the base may be coated by hanging the base by a wire or the like such that the resin can uniformly be coated over an entire face thereof easily. Thereafter, at step 105, coated fluororesin is baked.

Figure 10:
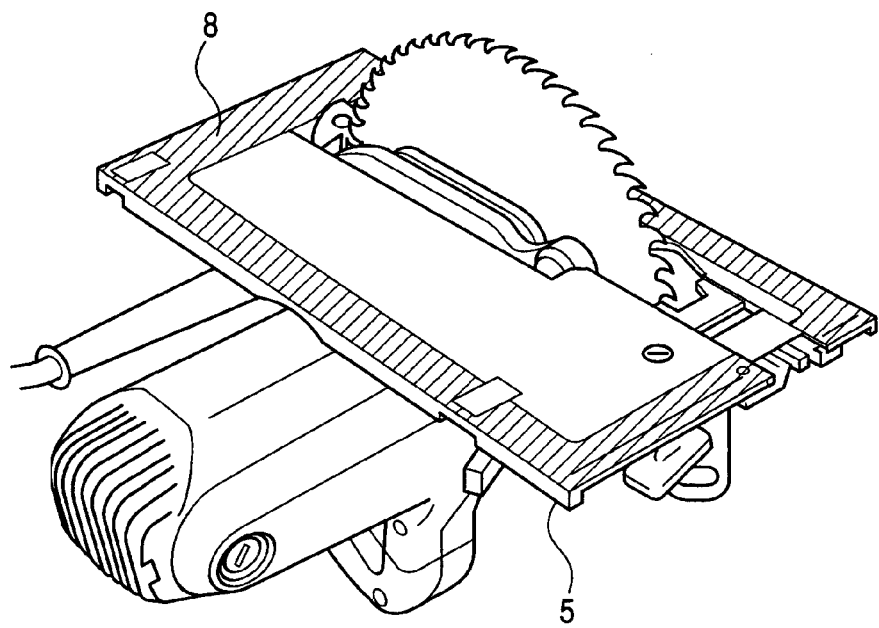
FIG. 10 is a perspective view showing an electric tool according to an embodiment of the invention.

With regard to a range of coating fluororesion 8, when fluororesin 8 is coated only on the outer peripheral portion of the bottom face of the base 5 which is particularly brought into close contact with and sliding on the work piece 7, mentioned above, as shown by FIG. 10, an effect thereof can be achieved, or particularly when the outer peripheral portion of the bottom face is thickly coated, sliding life of fluororesin 8 determined by wear thereof can be increased.

Figure 11:
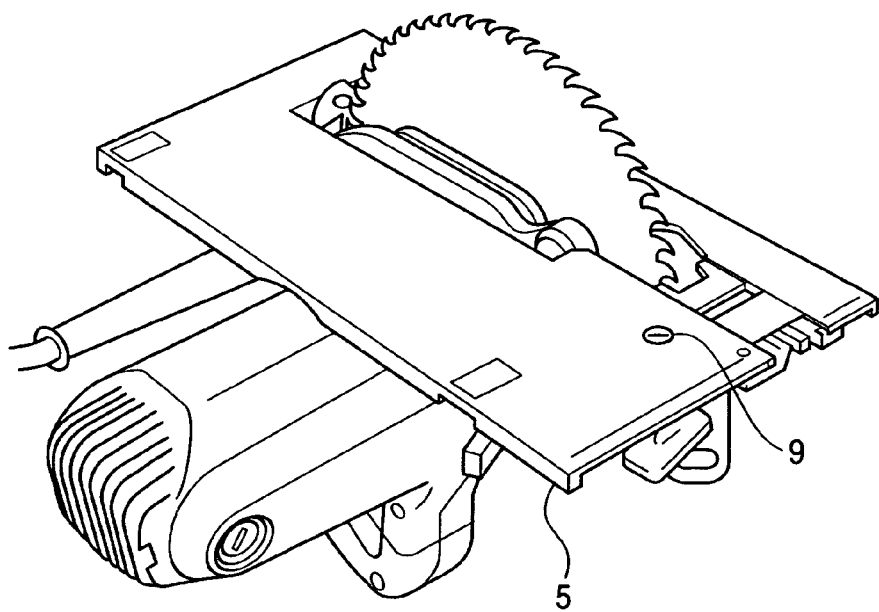
FIG. 11 is a perspective view showing an electric tool according to an embodiment of the invention.
Figure 12:
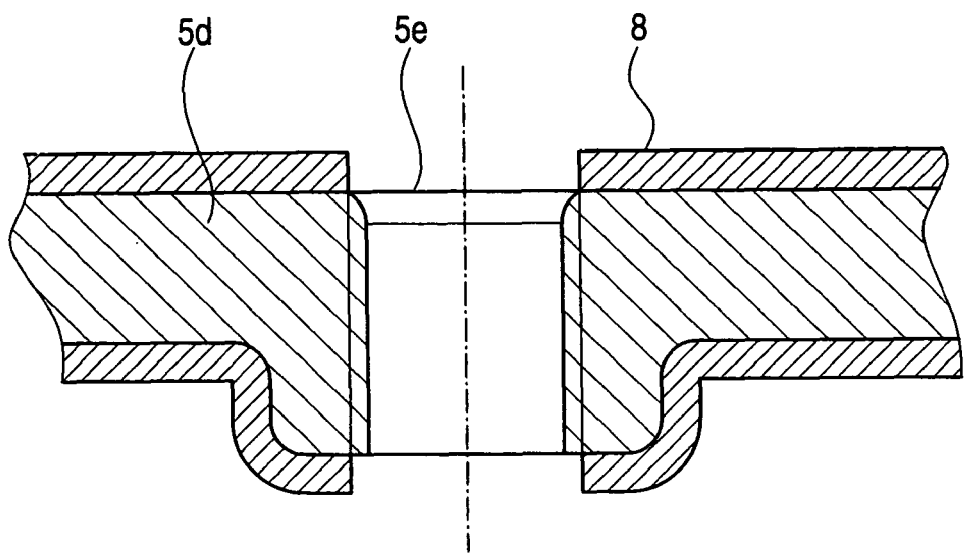
FIG. 12 is a sectional view enlarging an essential portion of FIG. 11 showing an electric tool according to an embodiment of the invention.

As shown by FIG. 11, when a portable circular saw or the like is provided with a screw 9 or the like capable of finely adjusting an inclination angle at, for example, the bottom face of the base 5, in coating fluororesin 8, when fluroresin 8 is prevented from being brought into a screw hole 5e as shown by FIG. 12, the screw 9 can be prevented from being slipped to loosen.

Further, by hanging the base by a wire or the like by way of a screw hole provided at the base 5 in coating the resin, it is not necessary to pinch the base 5 or the like, an uncoated portion produced by pinching the base 5 can be prevented from being produced and the resin can easily be coated over a total of the base 5.

Although when a baking temperature of fluororesin 8 is high, the base material is thermally deformed in baking to bring about a drawback of effecting an adverse influence of a deterioration in accuracy or the like, by using a low temperature type one, a width of choice of the heat resistance temperature of the material 5d of the base 5 is widened. Further, it is indispensable that the baking temperature of fluororesin 8 after coating is a temperature lower than a melting point of the base material 5d.

By approximating color of fluororesin 8 to color of the base material 5d, even when fluororesin 8 is flawed and the base material 5d is exposed, the flaw can be made to be inconspicuous.

Figure 13:
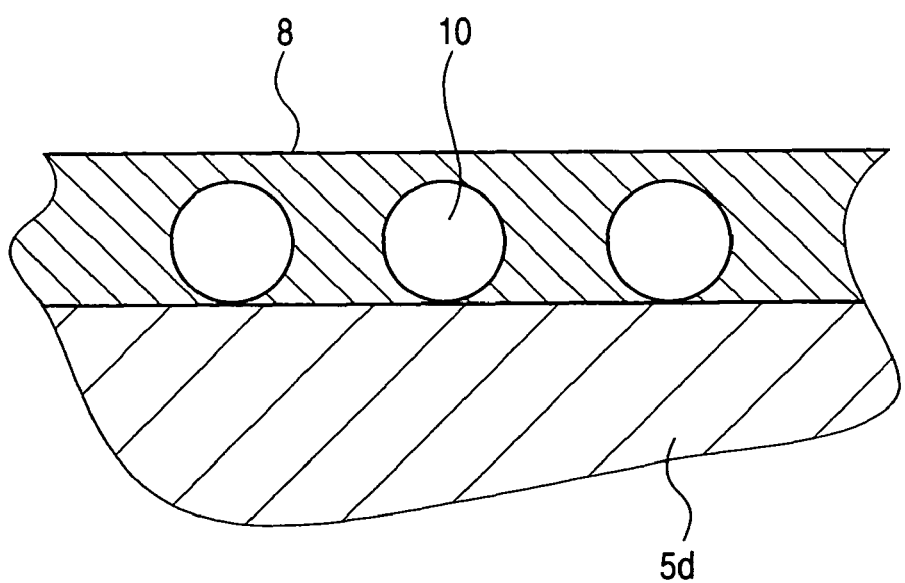
FIG. 13 is a sectional view showing an electric tool according to an embodiment of the invention.
Figure 14:
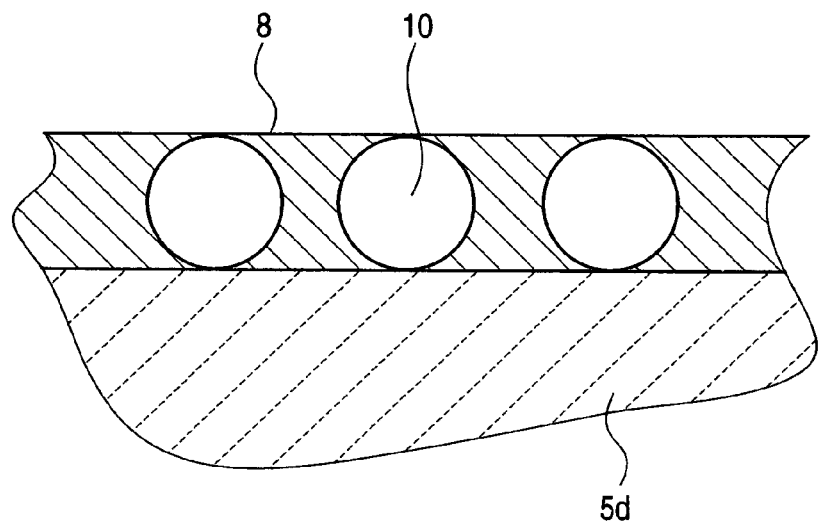
FIG. 14 is a sectional view showing an electric tool according to an embodiment of the invention.

With regard to wear of fluororesin 8 by bringing the base 5 into the close contact with the work piece 7 and sliding the base 5 thereon, by impregnating a powder 10 of ceramic or the like harder than fluororesin 8 in fluroresin 8 as shown by FIG. 13, even when fluororesin 8 at a surface thereof is worn as shown by FIG. 14, fluororesin 8 among the powder 10 is not worn and an effect of sliding can be continued.

Figure 15:
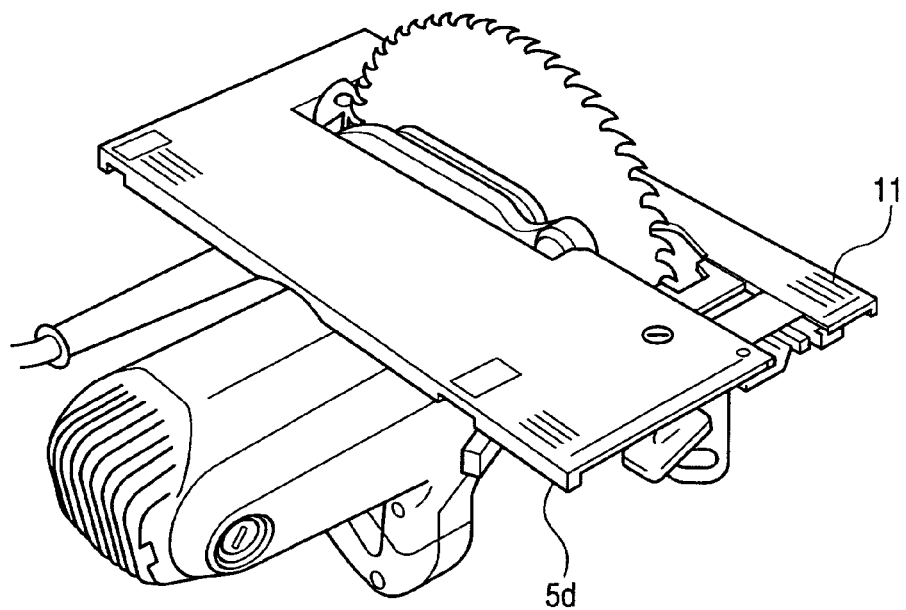
FIG. 15 is a perspective view showing an electric tool according to an embodiment of the invention.
Figure 16:
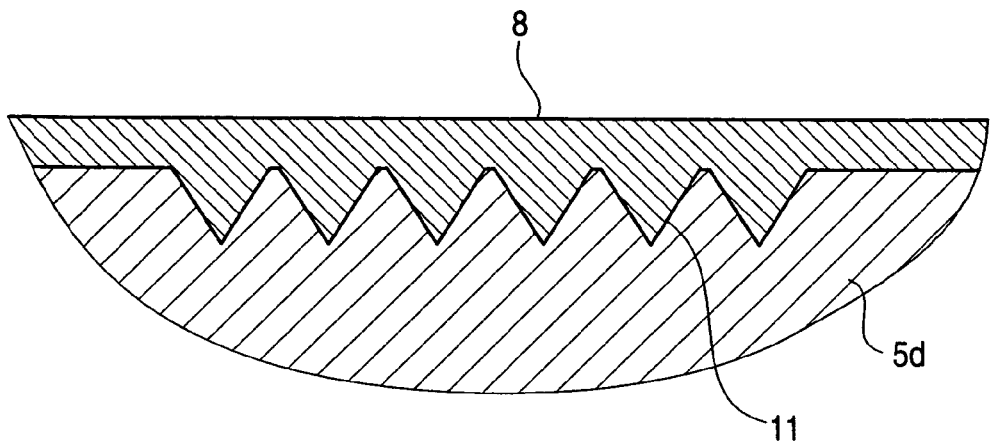
FIG. 16 is a sectional view enlarging an essential portion of FIG. 15 showing an electric tool according to an embodiment of the invention.
Figure 17:
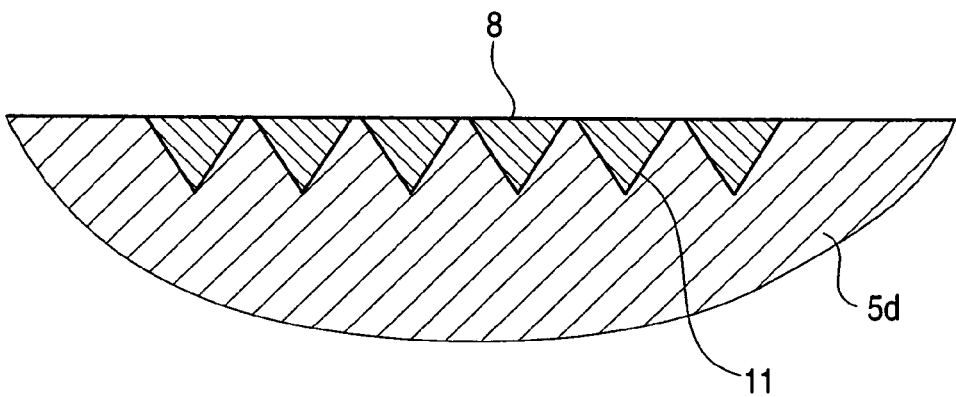
FIG. 17 is a sectional view enlarging an essential portion of FIG. 15 showing the electric tool according to an embodiment of the invention.

Or, when grooves 11 are provided at four corners of the bottom face of the base at which the base material 5d is particularly easy to wear as shown by FIGS. 15, 16, as shown by FIG. 17, even when fluororesin 8 is worn, an area of making the base material 5d come out to the surface is small and therefore, an amount of adhering dust can be restrained and deterioration in sliding can be restrained.

Figure 18:
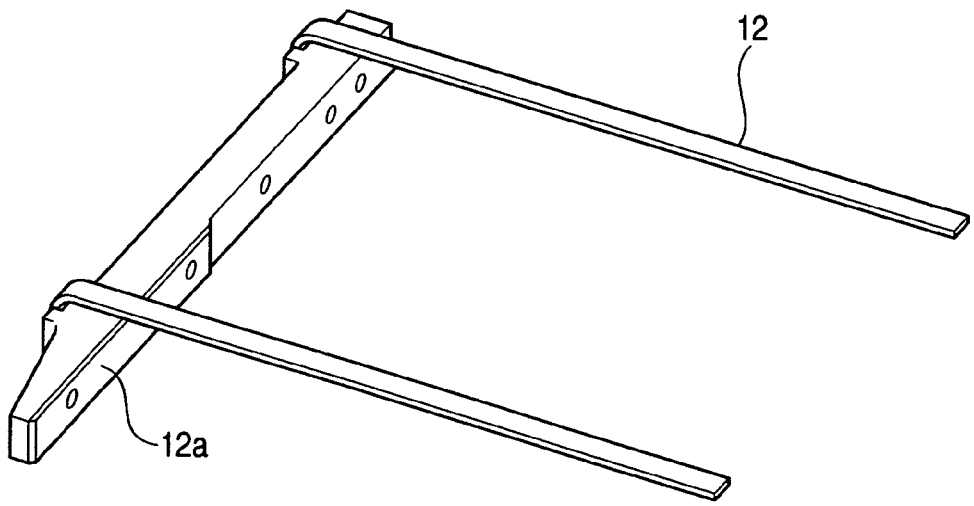
FIG. 18 is a perspective view showing an embodiment of a guide member according to an embodiment of the invention.
Figure 19:
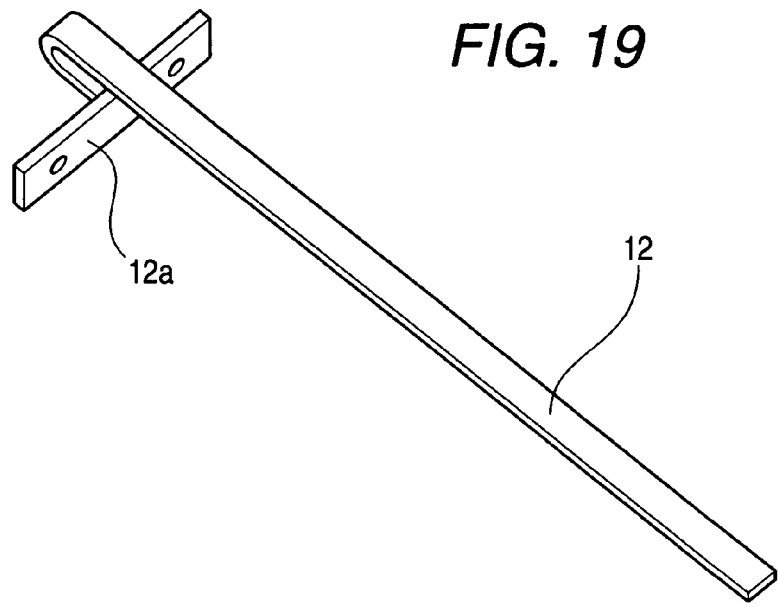
FIG. 19 is a perspective view showing other embodiment of the guide member.
Figure 20:
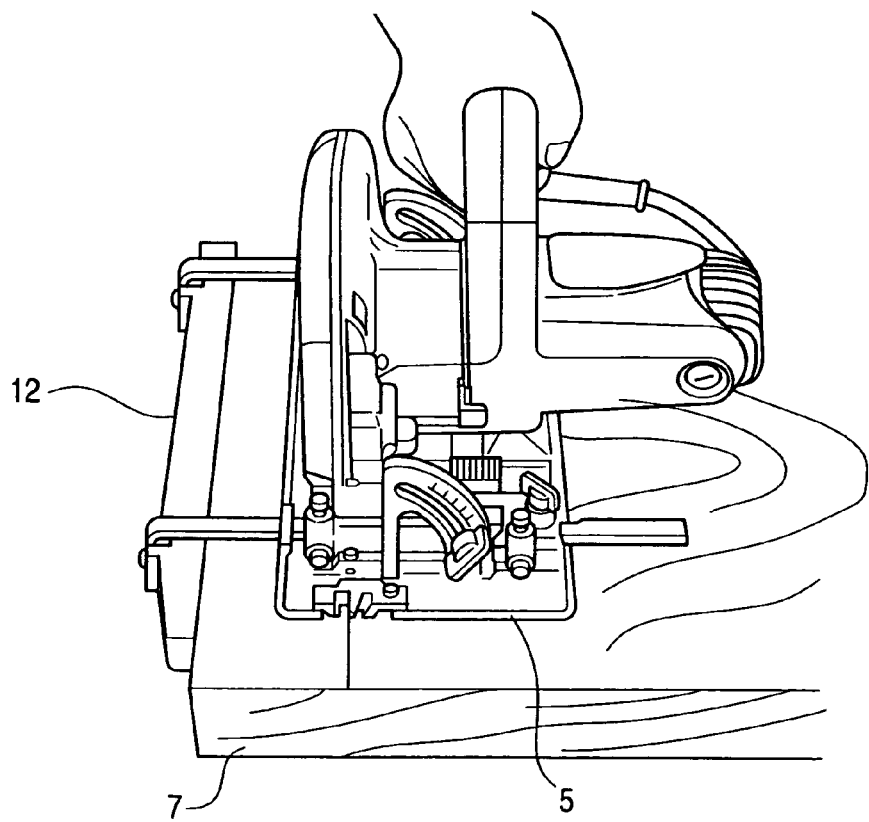
FIG. 20 is a perspective view showing the embodiment of the electric tool according to an embodiment of the invention.

For example, in a portable circular saw, there is a case of cutting the work piece 7 accurately in a straight line by utilizing a side face thereof as shown by FIG. 20 by using a guide 12 as shown by FIGS. 18, 19, in this case, when fluororesin 8 is coated not only on the bottom face of the base 5 but also on a sliding face 12a of the guide 12 shown in FIGS. 18, 19 sliding on the work piece 7, operability is improved by also reducing sliding resistance between the work piece 7 and the guide 12. The sliding face 12a of the guide 12 is a guide face opposed to the side face of the base 5 and the guide 12 is a guide member.

Figure 21:
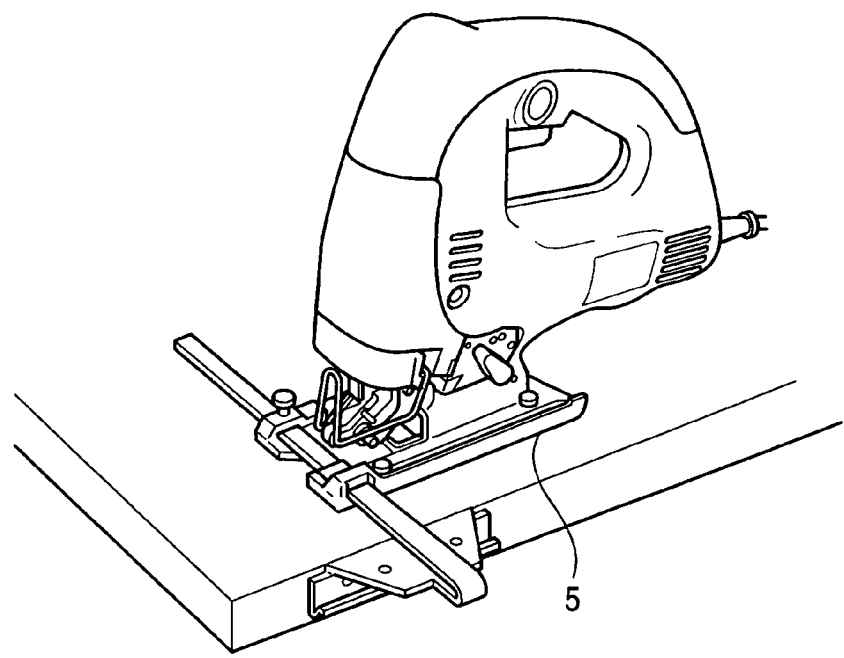
FIG. 21 is a perspective view showing other embodiment of the electric tool according to an embodiment of the invention.
Figure 22:
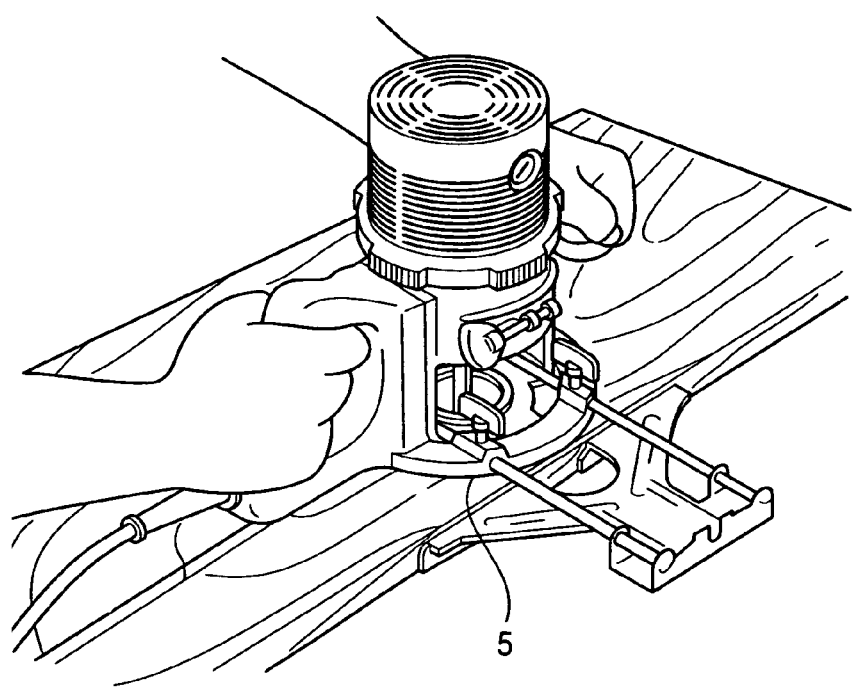
FIG. 22 is a perspective view showing an electric tool according to an embodiment of the invention.

According to an embodiment of the electric tool, otherwise, fluororesin may be coated on a base of a router mainly for grooving, or facing of various woods as shown by FIG. 21, or a jig saw or the like mainly for cutting and windowing various materials as shown by FIG. 22.

Further, there is a case of molding the base 5 by a magnesium alloy with an object of achieving light-weighted formation of the base 5, in this case, it is difficult to subject the base 5 to a plating treatment which has been carried out for a base made of an aluminum alloy in a related art and therefore, it is extremely useful to coat fluororesin on the base made of a magnesium alloy with an object of promoting slidability.

What is claimed is:

1. An electric tool, comprising:
   a base configured by a metal plate, the metal plate including:
      an opening portion;
      a bottom face;
      a front connector portion comprising one of an inclined surface and a curved surface; and
      a front end face which is substantially perpendicular to the bottom face and is connected to the bottom face by the front connector portion;
   a blade being projected downward from the bottom face of the metal plate through the opening portion of the metal plate, the blade being capable of cutting while sliding the bottom face of the metal plate on an upper face of a work piece;
   a motor driving the blade;
   a housing accommodating the motor; and
   a fluororesin coating formed on the bottom face of the metal plate and on said front connector portion,
   wherein a cross section of a center portion of the bottom face, taken in a direction extending from the front end face of the metal plate to a rear end face of the metal plate is substantially concave, and
   wherein a front end and a rear end of the bottom face in the cross section are substantially convex.

2. The electric tool according to claim 1, wherein the metal plate further comprises:
   a rear end face which is substantially perpendicular to the bottom face and is connected to the bottom face by a rear connector portion, said rear connector portion comprising one of an inclined surface and a curved surface, and
   wherein said fluororesin coating is formed on said rear connector portion.

3. The electric tool according to claim 1, wherein an inner periphery of said opening portion is substantially perpendicular to the bottom face of the metal plate and is connected to the bottom face by an inner connector portion, said inner connector portion comprising one of an inclined surface and a curved surface, and
   wherein said fluororesin coating is formed on the inner connector portion.

4. The electric tool according to claim 2, wherein an inner periphery of said opening portion is substantially perpendicular to the bottom face of the metal plate and is connected to the bottom face by an inner connector portion, said inner connector portion comprising one of an inclined surface and a curved surface, and
   wherein said fluororesin coating is formed on the inner connector portion.

5. The electric tool according to claim 1, further comprising:
   a guide member connected to the base and including a guide face opposed to a side face of the base,
   wherein the guide face of the guide member is at least partially coated by the fluororesin coating.

6. The electric tool according to claim 1, wherein an outer periphery of the center of the bottom face of the base is convex.

7. The electric tool according to claim 1, wherein the fluororesin coating is thickly coated on an outer peripheral portion of the bottom face of the base.

8. The electric tool according to claim 1, further comprising:
   a screw provided at the bottom face of the base for adjusting an inclination angle of the bottom face of the base,
   wherein the fluororesin coating is not formed on the screw.

9. The electric tool according to claim 1, wherein the base is provided with a roughened bottom face.

10. The electric tool according to claim 1, wherein said fluororesin coating is impregnated with one of a ceramic powder and a powder which is harder than fluororesin.

11. The electric tool according to claim 1, wherein a corner of the bottom face of the base includes a groove.

12. The electric tool according to claim 1, wherein the fluororesin coating is formed on an entirety of the bottom face.

13. The electric tool according to claim 1, wherein an entirety of said front end face is substantially perpendicular to said bottom face.

14. The electric tool according to claim 3, wherein said inner periphery of said opening portion is formed on a rear side of said opening portion in a cutting direction.

15. The electric tool according to claim 4, wherein the one of the inclined surface and the curved surface of the inner connector portion approaches a center of the opening as the inner connector portion extends from the bottom face of the metal plate to the opening portion.

16. The electric tool according to claim 1, wherein a center portion of the bottom face is substantially concave in a direction extending from the front end face of the metal plate to a rear end face of the metal plate, the center portion extending from at least a front side of the opening portion to a rear side of the opening portion.

17. The electric tool according to claim 1, wherein the fluororesin coating is impregnated with a ceramic powder.

* * * * *